June 4, 1929.  A. WEAVER  1,715,730

OVEN

Filed Feb. 1, 1927  2 Sheets-Sheet 2

Witnesses
C. L. McDonald
E. N. Lovewell

Inventor
Archie Weaver

By
E. G. Siggers
Attorney

Patented June 4, 1929.

1,715,730

UNITED STATES PATENT OFFICE.

ARCHIE WEAVER, OF MIDDLETOWN, OHIO.

OVEN.

Application filed February 1, 1927. Serial No. 165,167.

This invention relates to an oven which is preferably heated by electricity, and which has a door provided with improved means for tightly closing the same.

The objects of the invention are to provide means for collecting water which may be formed by the condensation of steam within the oven, thus preventing the same from running out of the oven; to provide an arrangement for preventing such water from obtaining access to the heating elements and short-circuiting the same; and to provide improved means for effecting a tight closure for the oven door, whereby heat is conserved, and the action of the oven is rendered more efficient.

The invention consists further in certain details of construction and combinations of elements, the advantages of which will be more fully explained in the following detailed description taken in connection with the accompanying drawings, illustrating the preferred embodiment thereof.

In the drawings:

Figure 4 is a section through the oven door and the portion of the oven adjacent thereto, the same being taken on the line 4—4 of Figure 2.

Figure 5 is a detail sectional view illustrating the engagement between the projecting fingers of the door and the adjacent portion of the oven.

Figure 6 is an isometric view of the complete oven.

Figure 1:
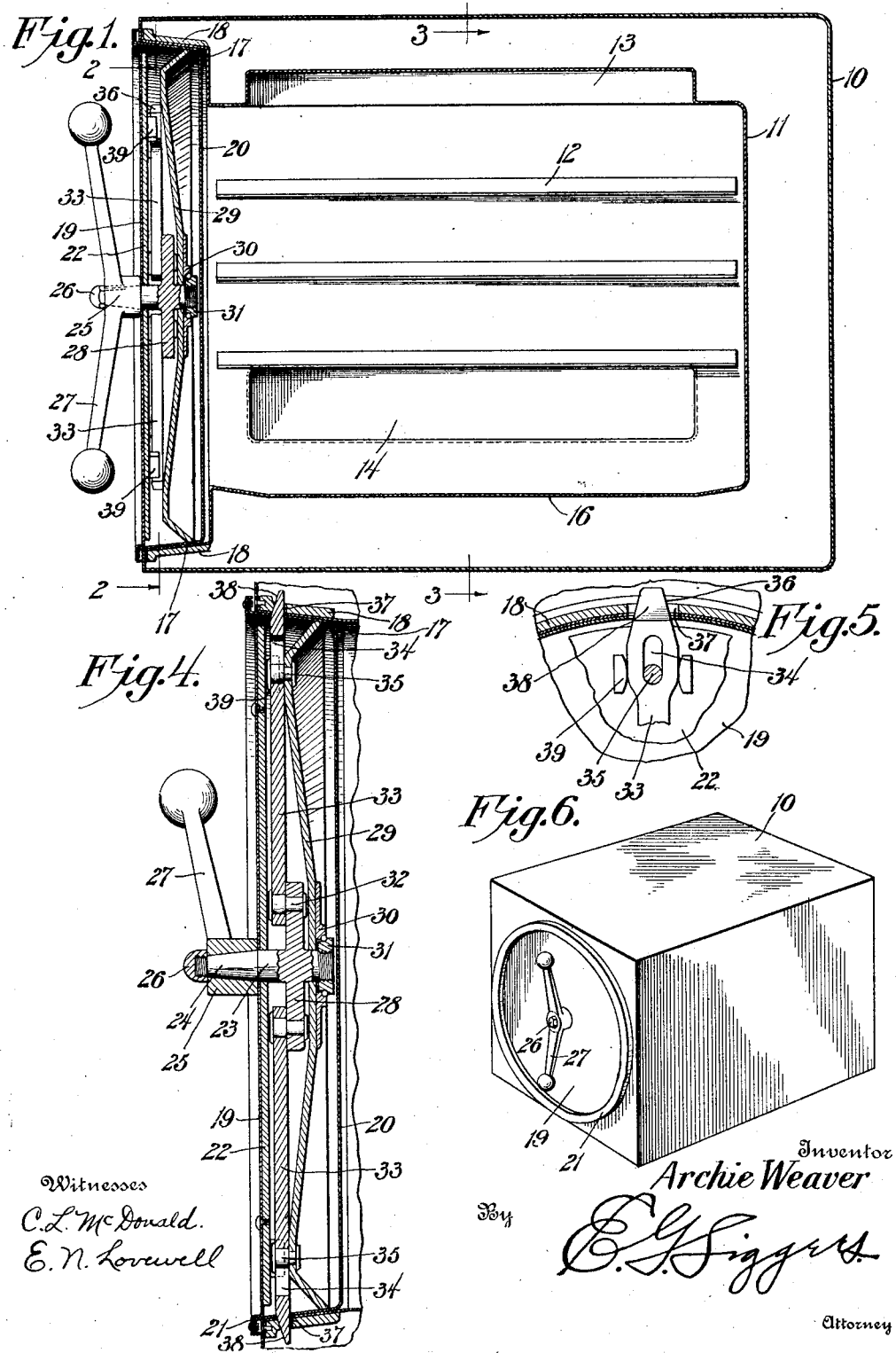
Figure 1 is a vertical longitudinal section of the oven.

As illustrated in the drawings, the oven comprises an outer wall 10, substantially rectangular in outline, and an inner wall 11. These walls may be constructed and joined in any suitable manner, and the space between them may be filled with heat insulating material. Cleats 12 may be secured to the inner wall for receiving suitable shelves. Spaces may be provided in the top and sides of the oven, as indicated at 13, 14 and 15 respectively, for receiving suitable electrical heating elements. The inner bottom wall 16 is dished, so as to collect any water which may be formed by the condensation of steam within the oven, and to prevent the same from running out of the front end of the oven when the door is opened. It will also be noted that the electrical heating elements are so disposed that they cannot be reached by the water collecting in the bottom of the oven and be short-circuited, or otherwise injured thereby.

The opening for the door is preferably circular, and is tapered inwardly to form a frusto-conical seat 17, which is reinforced by a ring 18 surrounding the same. The door is covered by a front flat casing member 19, and a rearwardly tapered casing member 20 secured thereto by a flange seam 21, which projects over the periphery of the opening. The front casing member 19 has a reinforcing disk 22 secured to its inner face, and a shaft 23 is rotatably mounted centrally thereof. The front end of the shaft 23 is tapered, as shown at 24, and receives a collar 25. The inner face of this collar is tapered to fit the tapered end 24, and is keyed to the latter, being secured thereon by a nut 26 on the outer end of the shaft. Handles 27 are integrally, or otherwise, secured to the collar 25, so that the shaft 23 may be rotated to lock or unlock the door.

A hub 28 is integrally or otherwise secured to the shaft 23 beyond the disk 22, and a pressure disk 29 is mounted on the shaft beyond the hub 28. A ball race 30 is secured to the rear face of the pressure disk 29, and cooperating therewith is a cone 31 secured to the rear end of the shaft 23, so as to form a thrust bearing.

A plurality of shouldered rivets or pins 32 are mounted in the hub 28, and constitute pivots to which the inner ends of fingers 33 are connected. These fingers are formed near their outer ends with slots 34 for receiving shouldered pins or rivets 35, which are mounted in the pressure disk 29 near the periphery thereof. The fingers 33 bear against the pressure disk 29 and the latter is dished, so as to guide the fingers 33 in a common plane, parallel to and adjacent the rear face of the disk 22.

The outer ends of the fingers 33 are tapered, as shown at 36, and are adapted to be projected into holes 37 formed in the ring 18. The front faces of the ends 36 are beveled, as shown at 38, so that as the fingers are projected into the openings, the fingers and the pressure disk 29 will be forced rearwardly. The fingers 33, as they are moved longitudinally into or out of the holes 37 are guided not only by the pins or rivets 35, but by lugs 39, which are formed on the rear face of the disk 22 adjacent the outer ends of the fingers.

Figure 2:
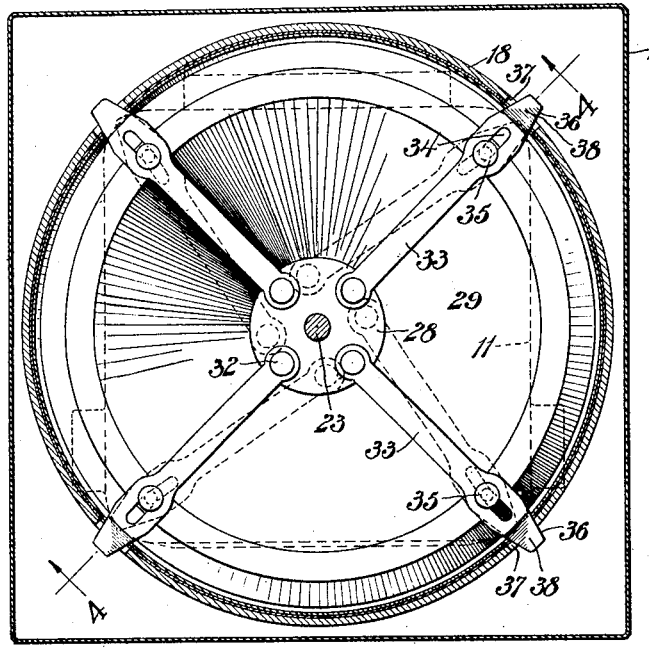
Figure 2 is a vertical section taken on the line 2—2 of Figure 1.
Figure 3:
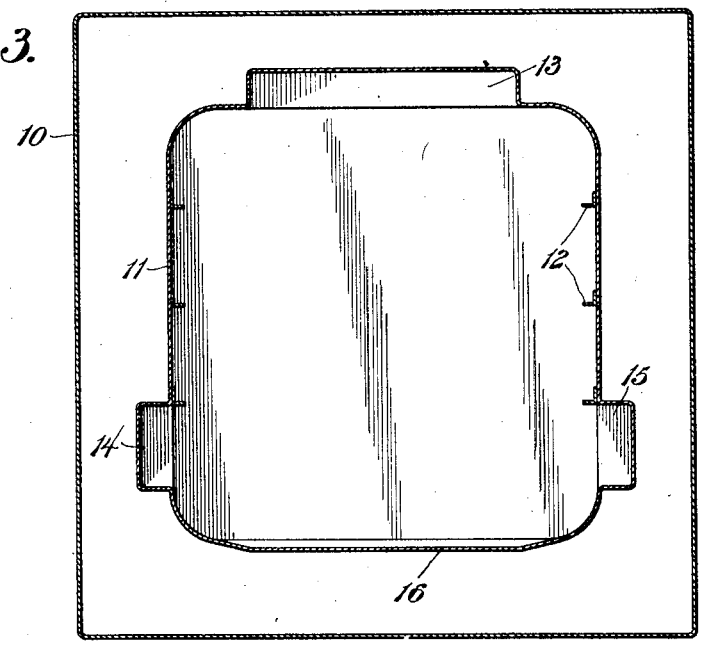
Figure 3 is a vertical section taken on the line 3—3 of Figure 1.

In closing the door, the fingers 33 will be initially retracted in the position shown in dotted lines in Figure 2. In this position, the fingers are substantially tangential to the hub 28. As the door is placed in position with the outer ends of the fingers opposite the holes 37, the handles 27 are moved toward the right to rotate the hub 28 and to project the fingers, bringing them into the position shown in full lines in Figure 2. During this operation, the beveled faces 38 of the fingers ride over the front edges of the openings 37 and force the door rearwardly. The periphery of the pressure disk 29, as it is forced inwardly along the tapered edge of the door casing, forces the edge of the door tightly against the seat, and effects a tight closure. The oven is substantially sealed, and practically no heat can escape therefrom.

While I have shown and described the construction of the oven and of the door sealing means in considerable detail, it is to be understood that this is merely for the purpose of illustration, and that various modifications may be made in the arrangement thereof without any material departure from the salient features of the invention as claimed.

What is claimed is:

1. In an oven, the combination of a body with an opening adapted to receive a door, the periphery of said opening being in the form of an inwardly tapered seat, a door comprising a casing tapered to correspond to said seat, a pressure disk within the casing, a shaft journaled in the casing and extending outside thereof, means for rotating said shaft, and means operable by the rotation thereof to force the pressure disk rearwardly against the tapered portion of the casing, thereby forcing the latter tightly against said seat.

2. In an oven, the combination of a plurality of walls defining an enclosed space and including a front wall with an opening adapted to receive a door, the periphery of said opening being in the form of a rearwardly tapered seat having holes therein, a door comprising a hollow casing having its peripheral wall tapered to correspond to said seat, a pressure disk within the casing, a shaft journaled in the pressure disk and casing and extending in front of the latter, means for rotating said shaft, a hub secured to the shaft within the casing, fingers pivotally connected to said hub and disposed in contact with the front face of the pressure disk, the ends of said fingers being projectible into said holes by the rotation of said shaft and hub, the end of each finger having a beveled face engageable with the face of the corresponding hole when the fingers are thus projected, thereby forcing the fingers and the pressure disk rearwardly to cause the latter to engage the tapered portion of the casing and to force it tightly against said seat.

3. In an oven, the combination with a front wall having an opening adapted to receive a door, the periphery of said opening being in the form of a rearwardly tapered seat having holes therein, of a door comprising a casing tapered to correspond to said seat, a pressure disk within the casing, a shaft mounted perpendicular to the plane of the door and extending in front of the latter, means for rotating said shaft, a hub secured to the shaft within the casing, fingers pivotally connected to said hub and having pin and slot connections with the pressure disk near the edge of the door, the ends of said fingers being projectible into said holes by the rotation of the shaft and hub, said pressure disk being dished so that the fingers bear against the same in a plane parallel to the face of the door, the end of each finger having a beveled face engageable with the front face of the corresponding hole when the fingers are thus projected, thereby forcing the fingers and the pressure disk rearwardly to cause the latter to engage the tapered portion of the casing and to force it tightly against said seat.

4. In an oven, the combination with a front wall having an opening adapted to receive a door, the periphery of said opening being in the form of a rearwardly tapered seat having holes therein, of a door comprising a casing tapered to correspond to said seat, a pressure disk within the casing, a shaft mounted perpendicular to the plane of the door and extending in front of the same, a hub secured to the shaft within the casing, fingers pivotally connected to the hub with their ends projectible into the respective holes in the seat by the rotation of the shaft and hub, pin and slot connections between the pressure disk and the fingers for guiding the fingers in contact with said disk as the fingers are projected or retracted, lugs on the inner face of the door casing between which the fingers are also guided, the end of each finger having a beveled face engageable with the front edge of the corresponding hole when the fingers are thus projected, thereby forcing the fingers and the pressure disk rearwardly to cause the latter to engage the tapered portion of the casing and to force it tightly against said seat.

5. The combination with an oven or the like having an outer casing and an inner casing connected together by a front wall formed to provide an inwardly tapered seat having a plurality of radial holes therein; of a closure therefor comprising a hollow structure formed to close the inner oven casing and having a flexible, tapered, peripheral wall to fit the seat; a pressure disk having a beveled periphery and mounted within the closure; a hub mounted centrally of the closure so as to be oscillated manually; radial fingers pivoted at their inner ends to the hub and having bevelled front faces at their outer ends, said fingers bearing against the pressure disk; connections between the pressure disk and the fingers adjacent to the outer ends of the latter to guide the fingers into the radial holes of the seat and force the closure into position with the beveled periphery of the disk pressing the tapered wall of the closure against the seat.

In testimony that I claim the foregoing as my own, I have hereto affixed my signature.

ARCHIE WEAVER.